(12) United States Patent
Schleifer et al.

(10) Patent No.: US 9,390,172 B2
(45) Date of Patent: Jul. 12, 2016

(54) COMMUNICATION CHANNEL BETWEEN WEB APPLICATION AND PROCESS OUTSIDE BROWSER

(75) Inventors: Jason E. Schleifer, Cambridge, MA (US); Raymond Ozzie, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/630,208

(22) Filed: Dec. 3, 2009

(65) Prior Publication Data

US 2011/0138059 A1 Jun. 9, 2011

(51) Int. Cl.
*G06F 15/16* (2006.01)
*G06F 17/30* (2006.01)
*G06F 9/54* (2006.01)
(Continued)

(52) U.S. Cl.
CPC .......... *G06F 17/30861* (2013.01); *G06F 9/541* (2013.01); *G06F 9/45529* (2013.01); *G06F 21/128* (2013.01)

(58) Field of Classification Search
CPC G06F 3/04817; H04M 1/72561; H04W 4/20; H04L 12/2801; H04N 7/165; H04N 7/17318; H04N 7/17336; H04N 21/26241; H04N 21/4335; H04N 21/632
USPC ....................................................... 709/227
See application file for complete search history.

(56) References Cited

U.S. PATENT DOCUMENTS 5,696,591 A * 12/1997 Bilhorn .............. G01N 21/8903
250/559.03
6,119,166 A * 9/2000 Bergman ................ H04L 29/06
709/232
(Continued)

FOREIGN PATENT DOCUMENTS

CN 101488143 A 7/2009
JP 2004-005647 A 1/2004
(Continued)

OTHER PUBLICATIONS

"Privacy Statement"—Published Date: 2008 http://silverlightbridge.net/Home/tabid/905/ctl/Privacy/Default.aspx.
(Continued)

*Primary Examiner* — Hamza Algibhah
*Assistant Examiner* — James Edwards
(74) *Attorney, Agent, or Firm* — Micah Goldsmith; Judy Yee; Micky Minhas

(57) ABSTRACT

One or more techniques and/or systems are disclosed herein for relaying a request to a process running on a computing device from a web client and receiving a response from the process. A bridge message client disposed in a web application, running in a browser on a computer, opens a local connection to a process running outside the browser. The bridge message client comprises a communication channel ID that identifies a communication channel to host the local connection to a bridge server, and a bridge message client ID facilitates communications from the bridge server to the web application. The bridge server is disposed outside of the browser environment, and can receive a request from the bridge message client and forward it to the process, and/or can receive a response to the request from the process and forward it to the bridge message client over the local connection.

21 Claims, 9 Drawing Sheets

(51) Int. Cl.
*G06F 21/12* (2013.01)
*G06F 9/455* (2006.01)

(56) References Cited

U.S. PATENT DOCUMENTS

| | | | | |
|---|---|---|---|---|
| 6,141,699 | A * | 10/2000 | Luzzi | G06F 11/3495 707/999.01 |
| 6,341,314 | B1 * | 1/2002 | Doganata | G06F 9/5027 707/E17.107 |
| 6,725,238 | B1 * | 4/2004 | Auvenshine | G06F 17/30194 |
| 6,968,539 | B1 | 11/2005 | Huang | |
| 7,346,649 | B1 * | 3/2008 | Wong | G06F 17/30867 707/E17.109 |
| 7,752,556 | B2 * | 7/2010 | Forstall | G06F 9/4443 715/761 |
| 8,336,097 | B2 * | 12/2012 | Kim | G06F 21/554 713/165 |
| 2002/0008093 | A1 * | 1/2002 | Ukita | B23K 26/032 219/121.72 |
| 2004/0153712 | A1 * | 8/2004 | Owhadi | G06F 11/0709 714/4.2 |
| 2004/0249958 | A1 * | 12/2004 | Ozdemir | H04L 63/029 709/229 |
| 2005/0120242 | A1 * | 6/2005 | Mayer | G06F 21/56 726/4 |
| 2006/0075069 | A1 * | 4/2006 | Mohan | G06Q 10/10 709/218 |
| 2006/0195544 | A1 * | 8/2006 | Chan | H04L 67/02 709/216 |
| 2007/0022155 | A1 * | 1/2007 | Owens | G06Q 10/10 709/202 |
| 2007/0136579 | A1 * | 6/2007 | Levy | H04L 63/102 713/168 |
| 2008/0028416 | A1 * | 1/2008 | Gill | G06F 9/541 719/311 |
| 2008/0120412 | A1 * | 5/2008 | Icaza | H04L 67/16 709/225 |
| 2008/0168367 | A1 * | 7/2008 | Chaudhri | G06F 3/04817 715/764 |
| 2008/0168368 | A1 * | 7/2008 | Louch | G06F 3/048 715/764 |
| 2008/0313648 | A1 * | 12/2008 | Wang | G06F 21/53 719/315 |
| 2009/0037492 | A1 * | 2/2009 | Baitalmal | G06F 17/30575 |
| 2009/0055749 | A1 * | 2/2009 | Chatterjee | G06F 3/04817 715/738 |
| 2009/0093309 | A9 * | 4/2009 | Patel | A63F 3/081 463/42 |
| 2009/0094332 | A1 * | 4/2009 | Schemers, III | G06Q 10/107 709/206 |
| 2009/0100342 | A1 | 4/2009 | Jakobson | |
| 2009/0144362 | A1 * | 6/2009 | Richmond | H04L 12/1859 709/203 |
| 2009/0254998 | A1 * | 10/2009 | Wilson | G06F 9/5027 726/27 |
| 2009/0259731 | A1 | 10/2009 | Luk et al. | |
| 2009/0282345 | A1 * | 11/2009 | Smith | G06Q 10/109 715/744 |
| 2009/0300513 | A1 * | 12/2009 | Nims | A63F 13/00 715/747 |
| 2009/0320050 | A1 * | 12/2009 | Pousti | G06Q 10/10 719/328 |
| 2010/0004994 | A1 * | 1/2010 | Rocke | G06Q 30/02 705/14.55 |
| 2010/0095216 | A1 * | 4/2010 | Morse | G06Q 20/02 715/738 |
| 2010/0114857 | A1 * | 5/2010 | Edwards | G06F 17/30817 707/709 |
| 2010/0122271 | A1 * | 5/2010 | Labour | G06F 9/44526 719/328 |
| 2010/0146523 | A1 * | 6/2010 | Brigaut | G06F 17/30203 719/330 |
| 2010/0235762 | A1 * | 9/2010 | Laiho | G06F 17/30893 715/753 |
| 2010/0248681 | A1 * | 9/2010 | Phills | G08B 27/005 455/404.2 |
| 2010/0281107 | A1 * | 11/2010 | Fallows et al. | 709/203 |
| 2011/0055309 | A1 * | 3/2011 | Gibor | G06Q 30/02 709/202 |
| 2011/0085667 | A1 * | 4/2011 | Berrios | G06F 21/445 380/282 |
| 2011/0238791 | A1 * | 9/2011 | Nadeau | H04L 12/2801 709/219 |
| 2013/0006767 | A1 * | 1/2013 | Bennett | G06Q 30/0207 705/14.53 |
| 2013/0159394 | A1 * | 6/2013 | Labour | G06F 9/44526 709/203 |

FOREIGN PATENT DOCUMENTS

| | | |
|---|---|---|
| JP | 2004-302543 A | 10/2004 |
| JP | 2007-116641 A | 5/2007 |
| WO | 2008002274 A1 | 1/2008 |

OTHER PUBLICATIONS

Liivak, Priit "Java Web Applications on Desktop"—Published Date: 2008 http://www.ekabanov.net/Iiivak-bachelor-thesis.pdf.
"All Features"—Published Date: 2009 http://www.microsoft.com/silverlight/overview/top-features/all-features.aspx.
"Program Silverlight with the CoreCLR"—Published Date: 2009 http://msdn.microsoft.com/en-us/magazine/cc721609.aspx.
Niccolai, James; "ADOBE MAX: AIR 2.0 will give Greater Access to Local Desktop Resources"—Published Date: Oct. 7, 2009; http://www.macworld.co.uk/digitallifestyle/news/index.cfm?newsid=27362.
Petrovic,Mark S. "Discovering a Web Application's Secu . . ."—Published Date: 2009 http://grails.org/Discovering%20a%20web%20application's%20security%20requirements.
Wang et al., "Convergence of Desktop and Web Applications on a Multi-Service Os"—Retrieved Date: Oct. 23, 2009; http://www.usenix.org/event/hotsec09/tech/full_papers/wang.pdf.
"International Search Report", Mailed Date: Jun. 29, 2011, Application No. PCT/US2010/055689, pp. 9.
Int. Preliminary Report cited in PCT Application No. PCT/US2010/055689, dated Jun. 5, 2012, 5 pgs.
EP Search Report cited in EP Application No. 10834918.4 dated Apr. 10, 2013, 2 pgs.
EP Office Action cited in EP Application No. 10864918.4 dated Apr. 24, 2013, 5 pgs.
Reply EP Office Action cited in EP Application No. 10864918.4 dated Jul. 15, 2013, 8 pgs.
First Chinese Office Action cited in Chinese Application No. 201080054549.9 dated Feb. 11, 2014, 18 pgs.
Reply Chinese Office Action cited in Chinese Application No. 201080054549.9 dated Jun. 26, 2014, 4 pgs.
Reply second Chinese Office Action cited in Chinese Application No. 201080054549.9 dated Jan. 19, 2015, 4 pgs.
Third Chinese Office Action cited in Chinese Application No. 201080054549.9 dated Mar. 9, 2015, 14 pg.
Reply Japanese Office Action cited in Japanese Application No. 2012-542026 dated Jan. 19, 2015, 5 pgs.
Japanese Office Action cited in Japanese Application No. 2012-542026 dated Feb. 15, 2015, 2 pgs.
"Second Office Action Received in China Patent Application No. 201080054549.9", Mailed Dated: Nov. 3, 2014, 17 Pages.
"Office Action Issued in Japanese Patent Application No. 2012-542026", Mailed Date: Oct. 3, 2014, 6 Pages.
Reply Third Chinese Office Action cited in Chinese Application No. 201080054549.9 dated May 25, 2015, 4 pgs.
Fourth Chinese Office Action cited in Chinese Application No. 201080054549.9 dated Jun. 9, 2015, 13 pgs.
Sakakibara, Y. et al., "A Series of New Products That Enable Configuration of VPN with SSL", Nikkei System Configuration No. 121 System Integration, Nikkei Business Publication, Inc., Apr. 26, 2003, 4 pages.

* cited by examiner

COMMUNICATION CHANNEL BETWEEN WEB APPLICATION AND PROCESS OUTSIDE BROWSER

BACKGROUND

Users of the Internet and other online technologies can access remote information by receiving, for example, file transfers or web pages. Information and/or web-based application functionality can be displayed in a browser environment, such as on a personal computer (PC). Current web-based programming frameworks have been introduced that provide for web-based applications (web apps) to be developed that can be sent along with a web page, for example, to a user's browser environment (or run in an invisible browser-type environment as a gadget on the desktop). These frameworks can provide live, rich, interactive multimedia environments, for example, without having to send a user request back to the server, thereby providing the dynamic logic in web pages.

Often, the richly interactive web apps are loaded onto a user's computing device (e.g., PC, web-enabled mobile device, etc.) and maintain a live (or semi-live) connection with the Internet to provide updates and access requested information. For example, a user may load a widget onto their PC's desktop that displays current weather conditions for their location. While the computer maintains a connection to the Internet, in this example, the widget can update the displayed weather conditions for the user. Further, a browser may load a rich, interactive application (e.g., a Silverlight, Java, and Flash app) that provides a rich multimedia experience for the user, such as an application that tracks a baseball game, pitch-by-pitch with live scores, action, etc.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Presently, web-based applications (web apps) are not stand-alone applications that can interact directly with operating systems through operating system (OS) application programming interfaces (APIs) or indirectly with library functions which may in turn call the operating system APIs. For example, an ability to access the operating system APIs may give an application certain control of computing resources in a computer. Instead, web apps are run in a browser environment, for example, in a "sandbox" that is separated from the OS APIs and libraries, thereby creating a certain amount of security from malicious hackers.

Current web apps cannot be used as stand-alone applications that utilize access to a full range of resources on the users computer such as the file system management and the display area beyond the browser's window. In general, web pages cannot be processed in non-browser contexts. However, if a web app were able to access information from an application running in a desktop environment, for example, a richer and more useful experience can be provided to a user, such as by having desktop content provided for use by the web app. (e.g., the web app. can make use of desktop content). For example, where a web app, such as a web-based social network, wished for a user to add contacts to their profile, it may be desirable for the web-app to be able to load them from the user's desktop-based application that manages their contacts.

One or more techniques and/or systems are disclosed that provide a bridge between a web-based application, such as in a browser environment, and a desktop environment on a computer, such as where an application is running. As an example, the bridge can provide a way for a web app in the browser to communicate with a desktop application, for example, while maintaining appropriate security. For example, where web app requests information from an application the bridge can provide a way to send requests and retrieve responses from the application.

In one embodiment for relaying a request to a process running on a computing device from a web client and receiving a response from the process, a bridge message client in a web app running in a browser, can open a local connection to a process running outside the browser. In this embodiment, the bridge message client has a communication channel ID that identifies a communication channel to host the local connection, and a bridge message client ID to help a bridge server component to communicate with the web app. Additionally, in this embodiment, the bridge server component is outside of the browser environment, and can receive a request from the bridge message client and forward it to the process. Also, the bridge server component can receive a response to the request from the process and forward it to the bridge message client over the local connection.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
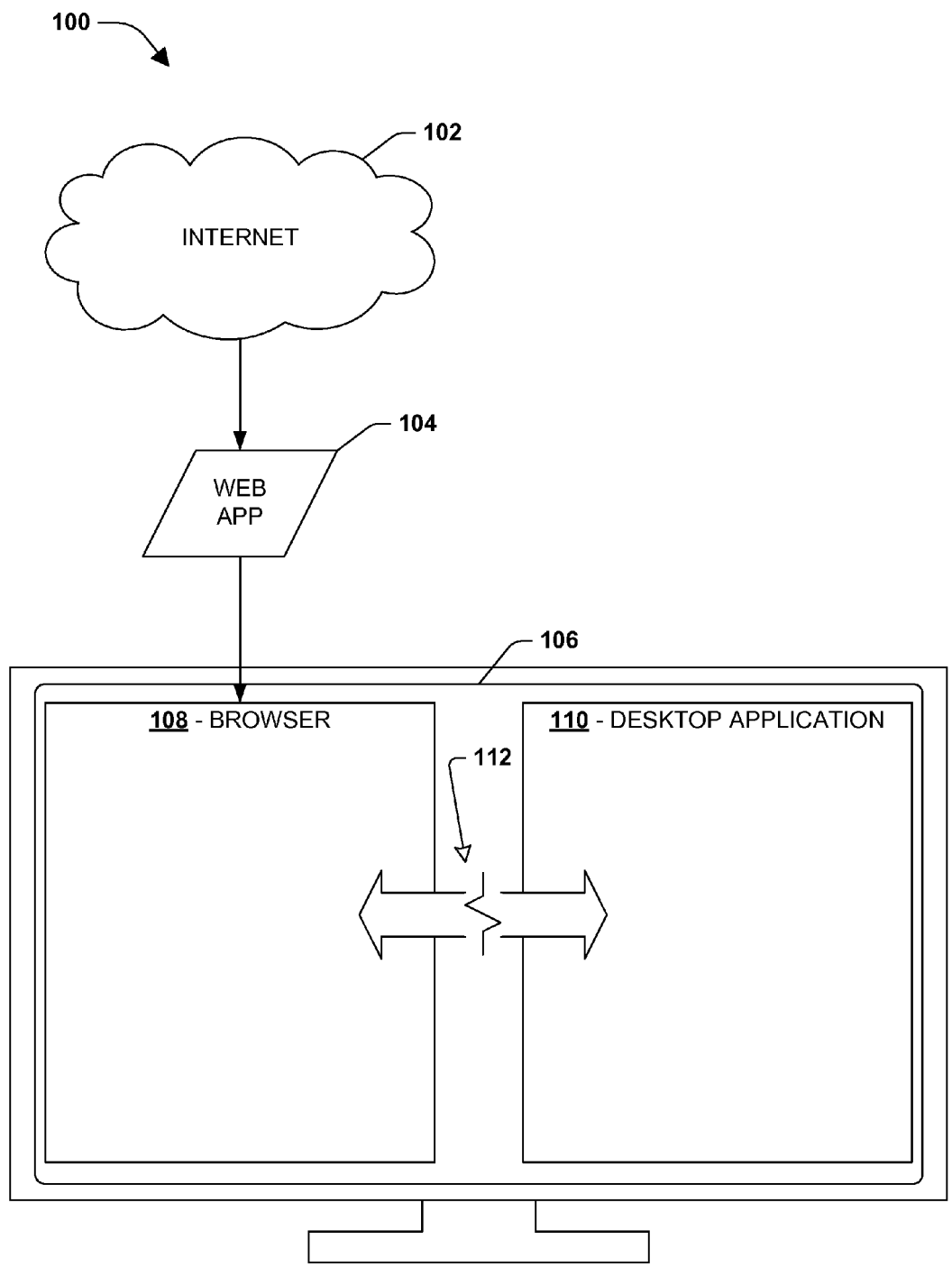
FIG. 1 is diagram illustrating an exemplary environment wherein one or more systems and/or techniques described herein may be implemented.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is diagram illustrating an exemplary environment 100 where one or more techniques and/or systems described herein may be implemented. A computing device 106 is running an application 110 in a desktop environment, such as a personal assistant program that manages contacts, calendars, emails, etc. running on the desktop of a personal computer. Further, a browser environment 108 is running on the computing device 106, and is connected to the Internet 102. In this exemplary environment 100, a web-based application 104 (web app) can be loaded to the browser environment 108 on the computing device 106.

For example, code used to run the web app 104 can be completely loaded to the browser environment 108 so that it operates entirely on the computing device 106 while maintaining a connection to the Internet 102, such as for live updates, etc. However, typical operating systems and computing environments do not allow a connection 112 between the web app running in the browser environment 108 and the application 110 running on the desktop environment. One reason for not allowing a connection 112 between a live web app that is connected to the Internet 102, for example, is to mitigate security breaches to the desktop environment of the computing device.

As provided herein, a bridge may be provided between a web-based application operating on a computing device, such as in a browser environment, and a desktop environment on a computer, for example. Further, the bridge can provide for communications between an application running in the browser environment and an application running in the desktop environment of the computer, for example, while maintaining appropriate security for the computing device. For example, where a web application, such as one created in a richly interactive, integrated multimedia runtime environment (e.g., Silverlight, Java, Flash and others), requests information from an application running outside of the browser environment, the bridge can provide a way to send requests and retrieve responses from the application while inhibiting potentially nefarious communications to the computing device.

Figure 2:
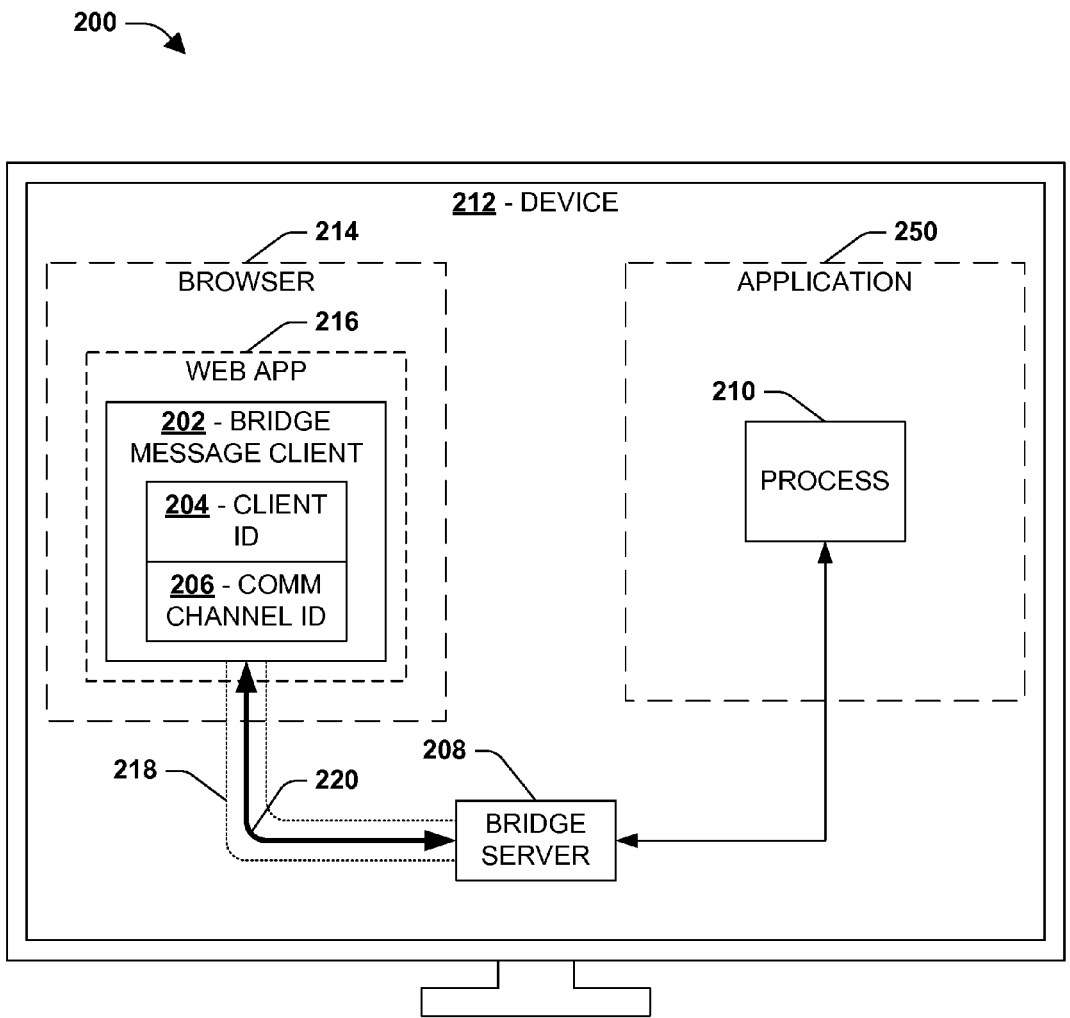
FIG. 2 is a component block diagram illustrating an exemplary system for relaying a request to a process running on a computing device from a web client and receiving a response from the process.

FIG. 2 is a component block diagram illustrating an exemplary system 200 for relaying a request to a process running on a computing device from a web client and receiving a response from the process. A bridge message client component 202 is disposed in a web application 216 that is running in a browser environment 214 on a computing device 212. The bridge message client component 202 opens a local connection 220 that connects to a process 210 running outside of the browser environment on the computing device, such as in a application 250 running in a desktop environment (not shown) on the computing device 212.

The bridge message client component 202 comprises a communication channel identification component 206 that identifies a communication channel 218 through which the local connection 220 to a bridge server component 208 disposed on the computing device 212, such as in the desktop environment (not shown), can be hosted. The bridge message client component 202 further comprises a bridge message client identification component 204 that helps the bridge server component 208 communicate with the web application 216, for example, where multiple bridge message client components 202, and/or web applications 216 may be attempting to communicate with the bridge server component 208.

In the exemplary system 200, the bridge server component 208 is disposed outside of the browser environment 214, and it can receive requests from the bridge message client component 202 and forward them to the process 210. Further, the bridge server component 208 can receive responses to the requests from the process 210 and forward them to the bridge message client component 202 over the local connection 220.

In one embodiment, the browser environment may have an instantiation of a web application (e.g., 216), for example, where an interactive, richly integrated multimedia webpage was loaded from a website to the browser (e.g., 214). In this embodiment, the web application can have an instantiation of the bridge message client component 202 disposed therein. Further, for example, the web application and associated bridge message client component 202 can be loaded to the browser environment, such as from a website, thereby running entirely on the computing device (e.g., 212).

In this embodiment, a communications channel 218 can be opened with the bridge server component 208, using the communication channel identification, and the local connection 220 can be hosted on the communications channel 218. In one embodiment, the communication channel identification component 206 can comprise a channel name, for example, that names a particular communication channel (e.g., 218) in the operating system that links communications from the web application to a bridge server component (e.g., 208) associated with a desired process (e.g., 210).

As an example, an operating system channel can be a component that processes a message in some way, for example, by authenticating a message. Further, in one embodiment, a communication channel 218 may be a transport channel, such as channels for Hyper Text Transfer Protocol (HTTP), named pipes, Transmission Control Protocol (TCP), and Microsoft Message Queuing (MSMQ), that can read and write messages from a network (or some other communication point outside of the computing device).

Further, as an example, the local connection 220 can be a publish/subscribe mechanism that connects senders and receivers between two (or more) instances of web application-based controls. In one embodiment, the bridge server component 208 may be an instantiation of the richly interactive, integrated multimedia runtime environment that is hidden (e.g., hidden from view and/or interaction by a user) on the computing device 212. In this embodiment, the local connection 220 can comprise a communications link between a first instantiation of the web-based application (running in the browser with the bridge message client component 202) and a second instantiation of a web-based application (the bridge server running outside the browser environment). In this example, the local connection 220 can use the named communications channel to establish the communications link between the bridge message client (e.g., 202) and the bridge server component (e.g., 208).

In one embodiment, the bridge server component 208 may be a component that is hosted by an application (e.g., 250) running on the computing device 212, such as in the desktop environment. Further, the bridge server component 208 may be a component instantiated as a service running on the computing device 212. It is appreciated that those skilled in the art may devise alternate ways to host or instantiate the bridge server component 208, for example, the bridge server component 208 may be comprised in one or more drivers installed in the desktop environment of the computing device.

Additionally, in one embodiment, the process (e.g., 210) may comprise at least a portion of a program running in a desktop environment on a computing device. For example, the process may comprise a portion of programming code that is inserted into an application running on a user machine. In this example, the code can be designed to communicate with the bridge server to return response data, such as a string of requested information, from the application. Where the web application requests specific data from the application using the bridge message client, for example, the process can return the requested information from the application to the bridge server component 208.

In one embodiment, the bridge message client identification 204 can comprise a client name, such as for the bridge message client component 202, which links the communications channel 218 from the bridge server component 208 associated with the process 210 to a desired web application (e.g., 216). That is, for example, where multiple web applications may respectively comprise instantiations of a bridge message client (e.g., 202), the bridge server may want to identify a particular bridge message client. In this way, in this example, a particular response to a request from the web application can be returned to a correct bridge message client. In this embodiment, the client ID 204 can facilitate the proper connection over the communications channel 218.

Figure 3:
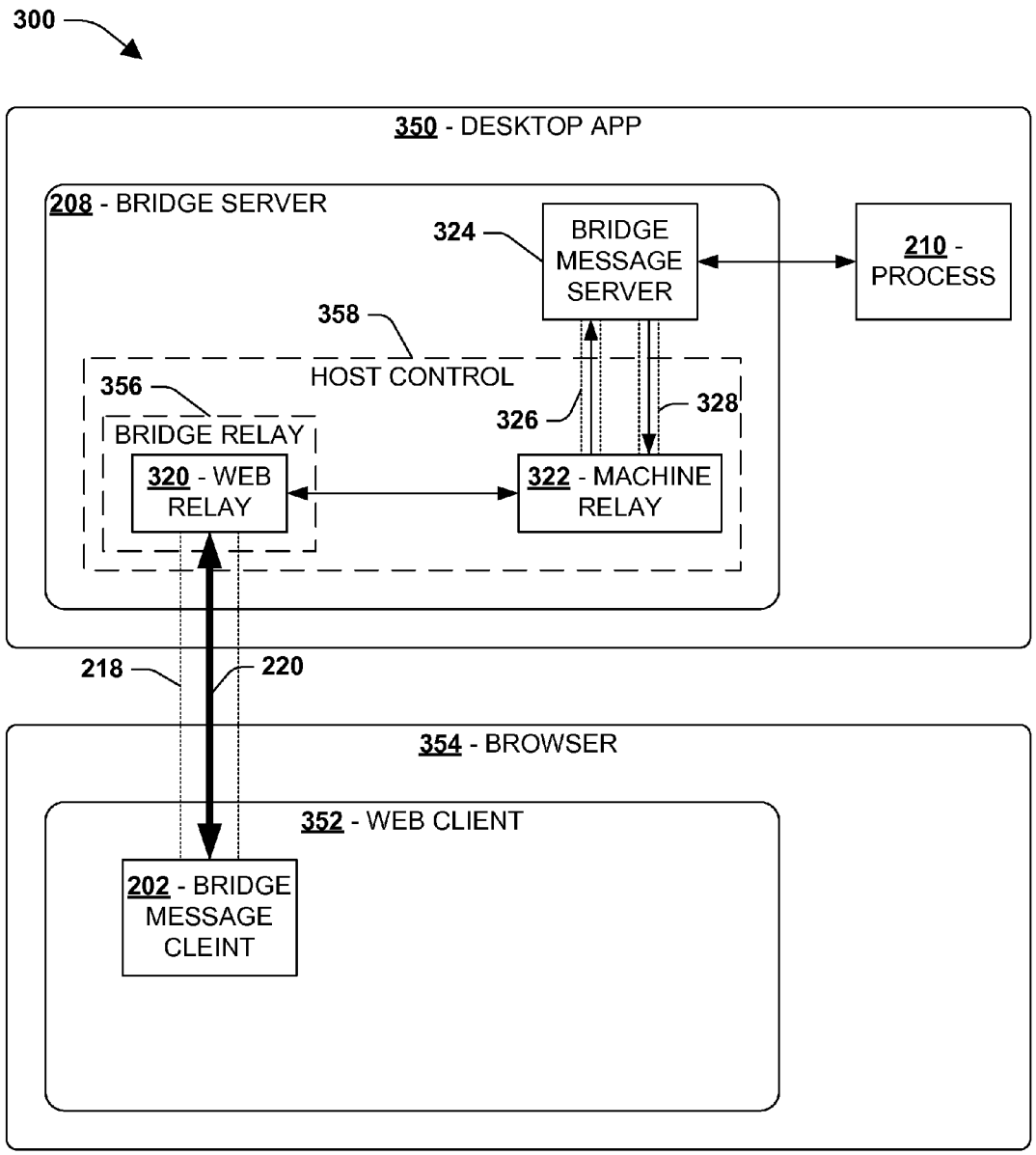
FIG. 3 is a component block diagram illustrating an exemplary embodiment of a system described herein.

FIG. 3 is a component block diagram illustrating one exemplary embodiment 300 of a system described herein. A web client 352, such as a web-based application, is disposed in a browser environment 354 (e.g., on a user's computer). The web client comprises a bridge message client component 202, which has a local connection 220 over a communications channel 218 to the bridge server component 208. The bridge server component 208 is disposed in a desktop application 350 (e.g., running on the user's computer) that also comprises the process 210.

In this exemplary embodiment 300, the bridge server comprises a web relay component 320, a machine relay component 322 and a bridge message server component 324. In this embodiment, the web relay component 320 and the machine relay component 322 are disposed in a same domain, the host control 358. In this example, the host control domain 358 can be instantiated in the bridge server component to host the web and machine relays. In one example, the host control 358 may further comprise a bridge relay 356, such as to receive and send data across the bridge, in which the web relay component 320 is disposed. In another embodiment, the web relay component 320 may be created as an instantiation of the machine relay component 322 in the same domain (e.g., host control 358).

In this embodiment 300, the web relay component 320 can receive a request from the bridge message client component 202 and forward it to the machine relay component 322. For example, the bridge message client component 202 can send a request for specific data from the process across the communication channel 218, using the local connection 220. Further, the bridge message client component 202 can receive the request from the web relay component 320 and forward it to the bridge message server component 324 over a first named communication pipe 326. As described above, a communications channel can comprise a named pipe for exchanging data, for example. In this embodiment, the machine relay can identify a first named communication pipe 326 to the bridge message server component 324 to forward the request. Additionally, the bridge message server component 324 can receive the request from the machine relay component 322 and forward it to the process 210.

In one embodiment, the process 210 can retrieve the requested information from the application 350 and return a response to the bridge message server component 324. The bridge message server component 324 can receive the response from the process 210 and forward it to the machine relay component 322 over a second named communication pipe 328. For example, the bridge message sever may identify a second name communications pipe to relay the message to the machine relay component 322. Further, the machine relay component 322 can receive the response from the bridge message server component 324 and forward it to the web relay component 356. Additionally, the web relay component 320 can receive the response from the machine relay component 322 and forward it to the bridge message client component 202 over the local connection 220.

As an example, the web client 352 can then utilize the information in the response, such as by displaying it in the browser environment 354. In one embodiment, the response can be received asynchronously. For example, the browser environment 354 may comprise a plurality of web clients 352, and/or a web client may comprise a plurality of bridge message client components 202. In this example, more than one bridge message client 202 may send requests to the process 210 at a same or substantially similar time. Responses to the plurality of request can be returned asynchronously.

Figure 4:
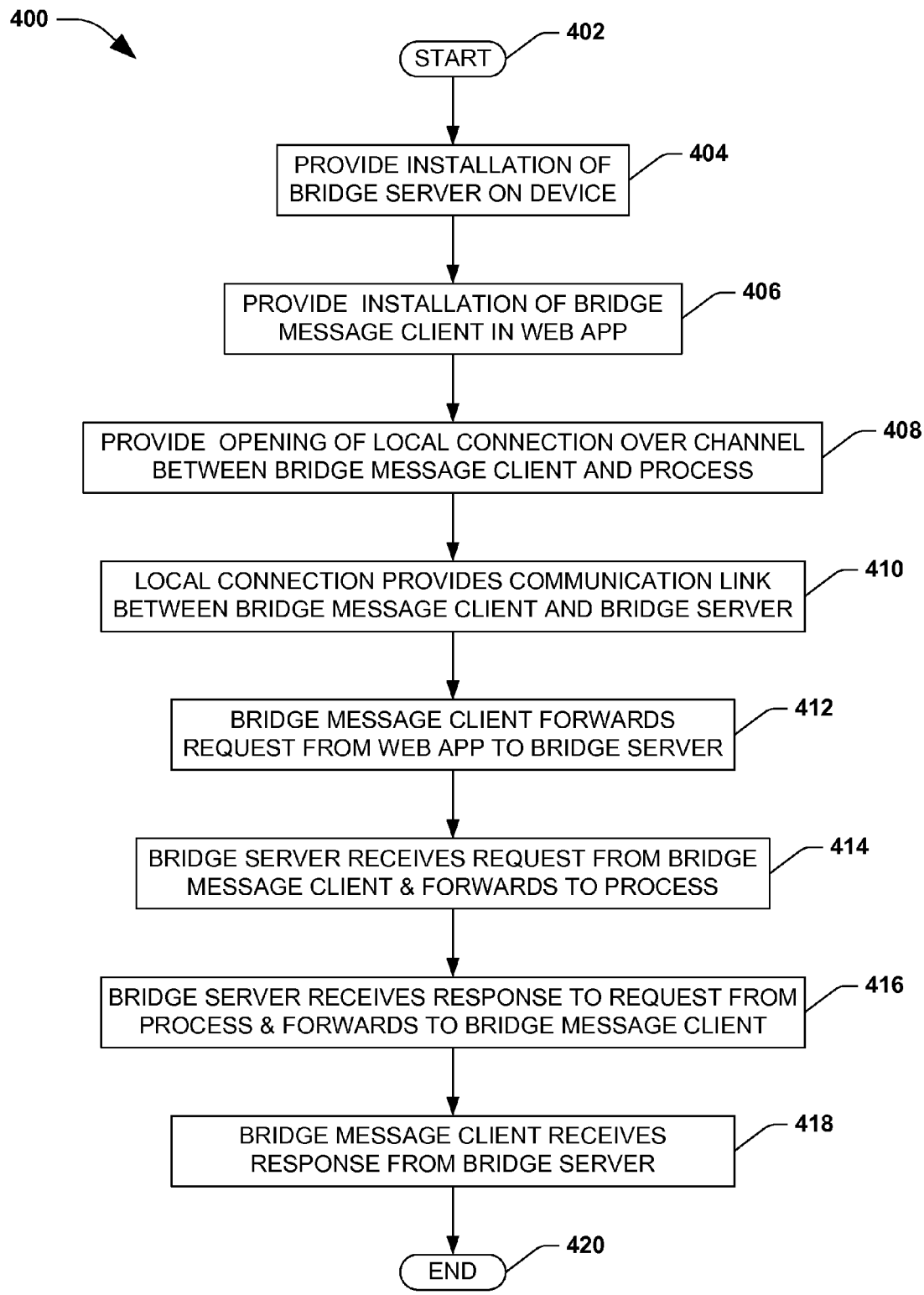
FIG. 4 is a flow diagram illustrating an exemplary method for relaying a request to a process running on a computing device from a web client and receiving a response from the process.

A method may be devised that allows for information to be sent between a browser environment and a desktop environment on a user's computer, for example. FIG. 4 is a flow diagram illustrating an exemplary embodiment of a method 400 for relaying a request to a process running on a computing device from a web client and receiving a response from the process. The exemplary method 400 begins at 402 and involves providing for a bridge server to be installed on the computing device outside of the browser environment, at 404.

At 406, an installation of the bridge message client in a web application is provided for, where the web application is configured to operate in the browser environment on the computing device. At 408, an opening of the local connection is provided, where the local connection is opened over an identified channel between the web application and the process. At 410, the local connection provides a communications link between the bridge message client and the bridge server that is associated with the process.

In the exemplary method 400, at 412, the bridge message client forwards a request from the web application to the bridge server over the local connection. At 414, the bridge server receives the request from the bridge message client over the local connection and forwards it to a process running outside of the browser environment on the computing device. Further, at 416, the bridge server receives a response to the request from the process and forwards it to the bridge message client over the local connection. At 418, the bridge message client receives the response to the request from the bridge server, for example, and a web application associated with the client utilizes the data in the response (e.g., displays it in the browser).

Figure 5A:
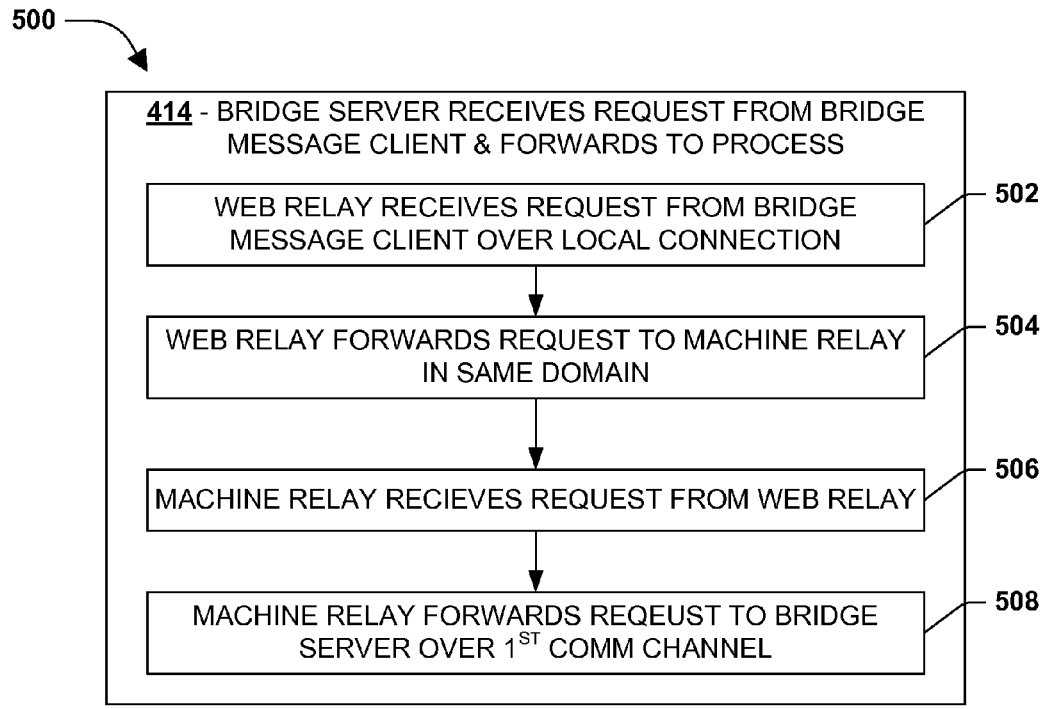
FIGS. 5A and 5B are an exemplary embodiment of a portion of a method described herein.
Figure 5B:
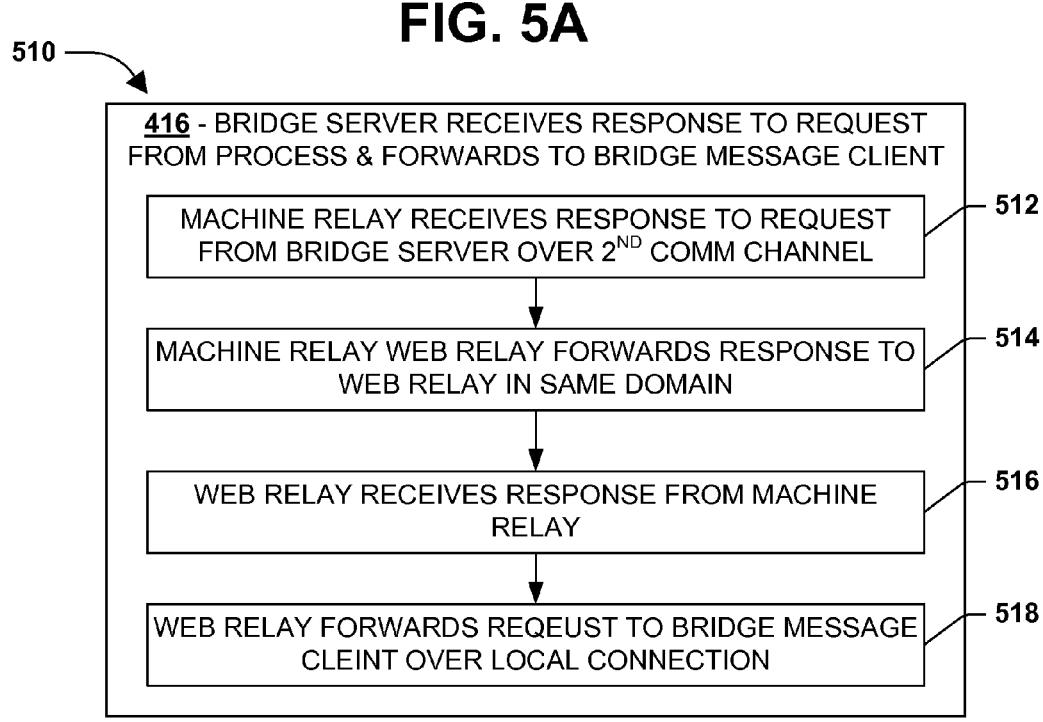

FIGS. 5A and 5B are an exemplary embodiment 500 and 510 of a portion of one or more of the methods described herein. In the exemplary embodiment 500, where the bridge server receives the request from the bridge message client and then forwards it to the process outside of the browser, at 414, a web relay, which is disposed outside of the browser environment on the computing device, receives the request from the bridge message client over the local connection, at 502. At 504, the web relay forwards the request to a machine relay, which is disposed in a same domain as the web relay component. At 506, in the exemplary embodiment 500, the machine relay receives the request from the web relay, and at 508, forwards it to a bridge message server over a first named communication pipe.

In the exemplary embodiment 510, where the bridge server receives a response to the request from the process and forwards it to the bridge message client, at 416, the machine relay, which is disposed outside of the browser environment in the computing device, receives the response to the request from a bridge message server over a second named communication pipe, at 512. At 514, the machine relay forwards the response to the request to a web relay disposed in the same domain. At 516, the web relay receives the response to the request from the machine relay, and at 518, forwards it to the bridge message client component over the local connection.

Figure 6:
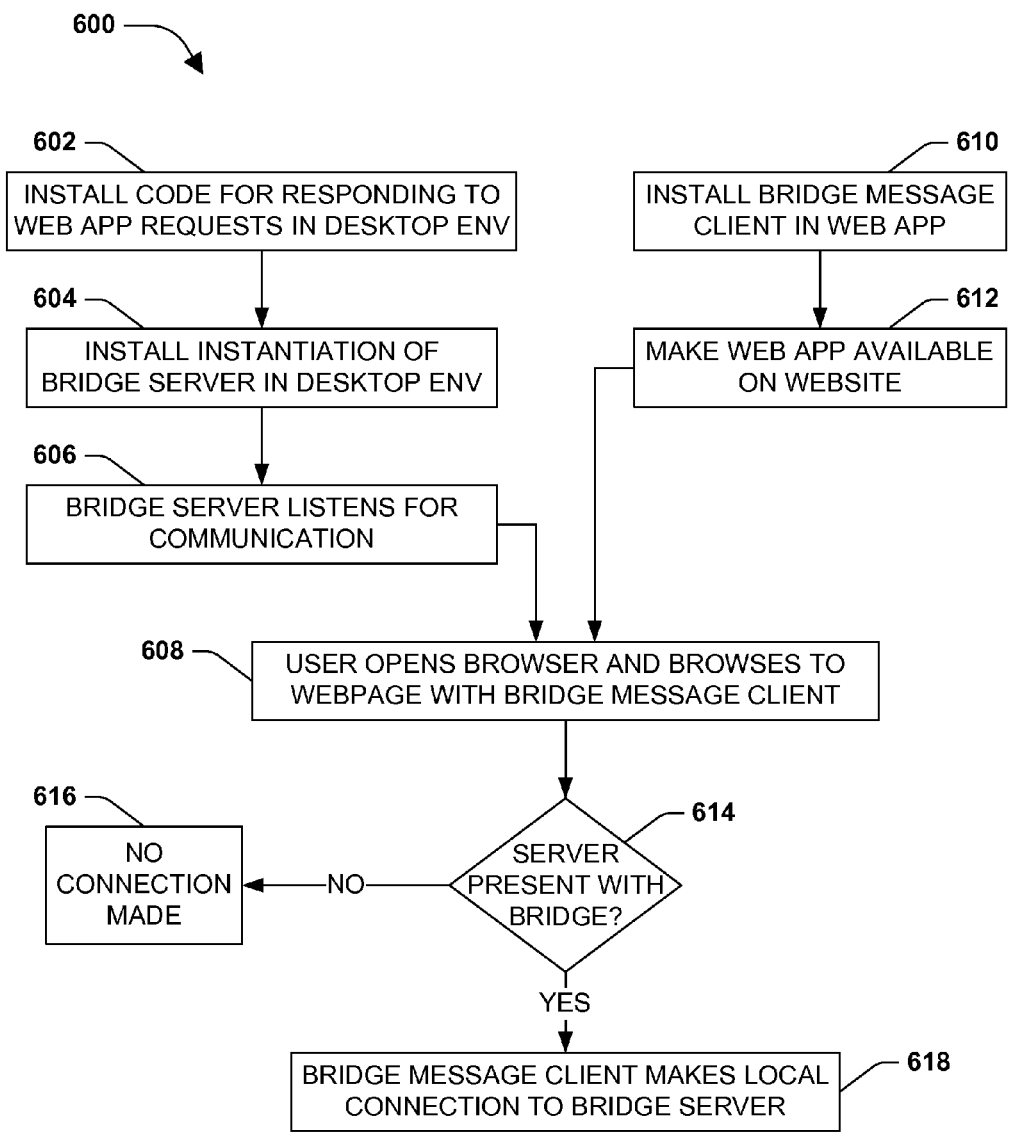
FIGS. 6 and 7 are flow diagrams that illustrate an exemplary embodiment of an implementation of one or more of the systems and methods described herein.
Figure 7:
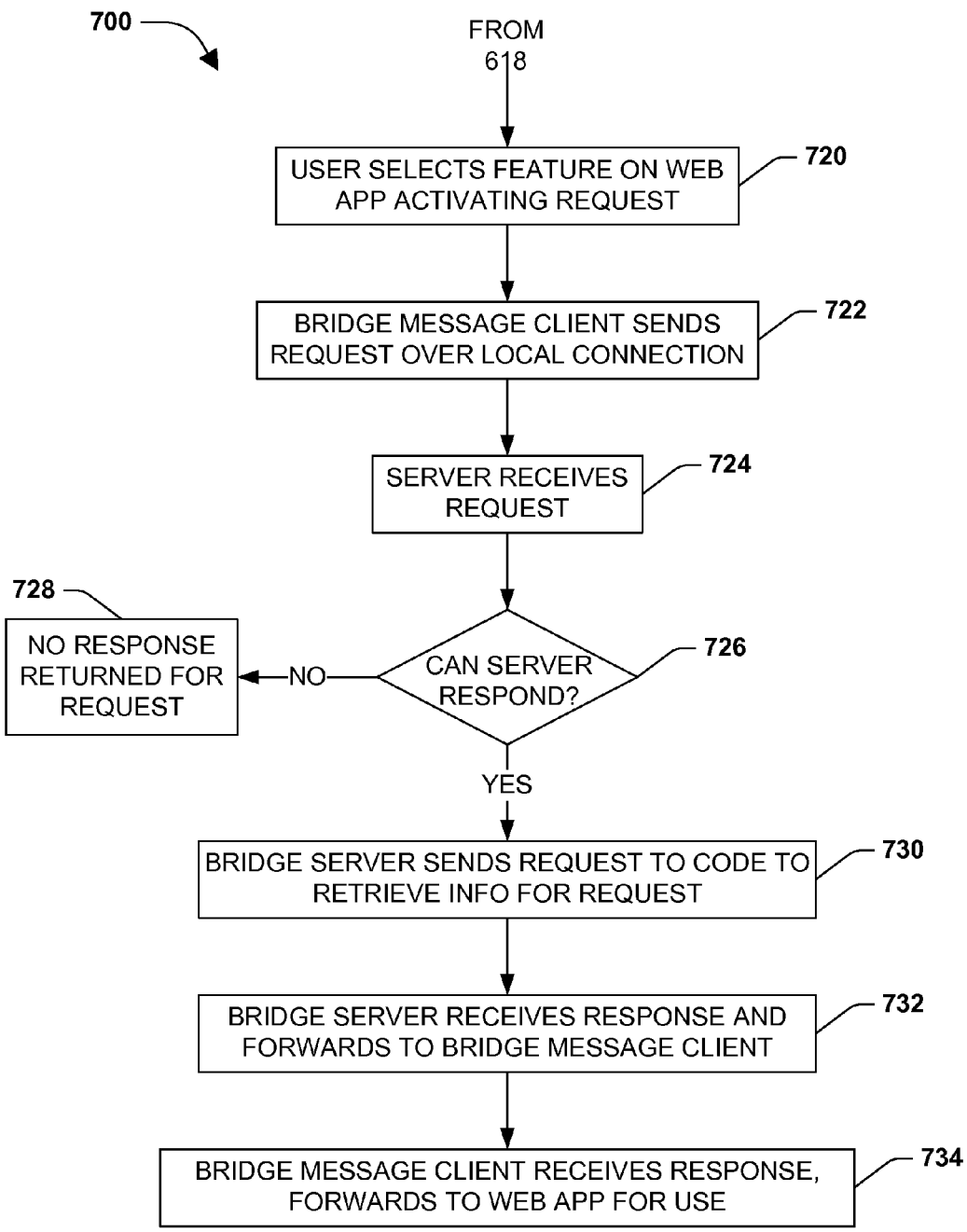

FIGS. 6 and 7 are flow diagrams that illustrate an exemplary embodiment of an implementation of one or more of the systems and/or methods described herein. In the exemplary embodiment 600, of FIG. 6, programming code that is configured to respond to a request from a web-based application (web app) is installed in a desktop environment of a computing device. For example, code may be developed and installed in an application that manages and processes a user's emails, contacts, calendars, tasks, etc. The code may be configured to allow a web application to request a user's contacts, or some other bits of information to be used in the web app.

At 604, an instantiation of the bridge server (e.g., 208 of FIG. 2) is installed in the desktop environment of the computing device. As an example, the bridge server may be comprised as a stand-alone component or service, or it may be included in the desktop application for which information may be requested by the web app. Once installed, the bridge server listens for communications, such as requests over a communications channel.

At 610, the bridge message client (e.g., 202 of FIG. 2) is installed in the web app. For example, a developer of the web app may download a version of the bridge message client from a same site, such as having a same root domain, as the bridge server. In this way, in this example, the bridge server may be able to trust communication requests from the bridge message client, thereby creating a type of security relationship. At 612, the web app, comprising the bridge message client, is made available on a website, such as the web app developer's website.

At 608, a user opens the browser environment, such as a web browser, and browses to the webpage that has the web app and associated bridge message client. As an example, the web app may be a richly integrated and interactive multimedia experience that enables the user to utilize additional features of the webpage by uploading data. At 614, it is determined whether there is a bridge server present in the desktop environment that has a bridge for the client. If a bridge server is not present, at 616, no connection is made with the client. However, if the bridge server is present, and a communications channel is available, the bridge message client makes a local connection with the bridge server, at 618. In one embodiment, providing for the local connection to be opened can comprise creating a communications link between the browser environment and the desktop environment of the computing device, which in turn may allow strings of data to be transferred from the desktop environment to the browser environment.

In the exemplary embodiment 700 of FIG. 7, at 720, the user selects the feature on the web app that activates a request for the desktop application. For example, the web app may comprise a button that states "click here to upload contacts from application." The user can click on that button to begin the request, in this example. At 722, the bridge message client can send the request, such as for the list of contacts in the user's contact management application, over the local connection the bridge server.

At 724, the bridge server receives the request from the bridge message client. At 726, the bridge server determines whether it can respond to the request. For example, the bridge server can determine whether it is associated with code for an application that allows the user's contacts to be uploaded. If not, at 728, no response for the request is return, for example, other than a null response.

If the bridge server can respond, at 730, the bridge server sends the request to the code, such as in the desktop application, to retrieve the requested information. For example, the request for the user's contacts can be forwarded to the code in the contact management application, where it can marshal the contacts into a string of data that comprises the contacts. At 732, the bridge server receives the response from the code in the application, and forwards it to the bridge message client.

At 734, the bridge message client receives the response and forwards it to the web app for use. For example, the web application can receive the user's contacts and display them to use in the browser. As another example, the web app may then load the contacts into a web-based contact management application, and/or allow other users to be added to a list in a social network from the user's contacts.

Figure 8:
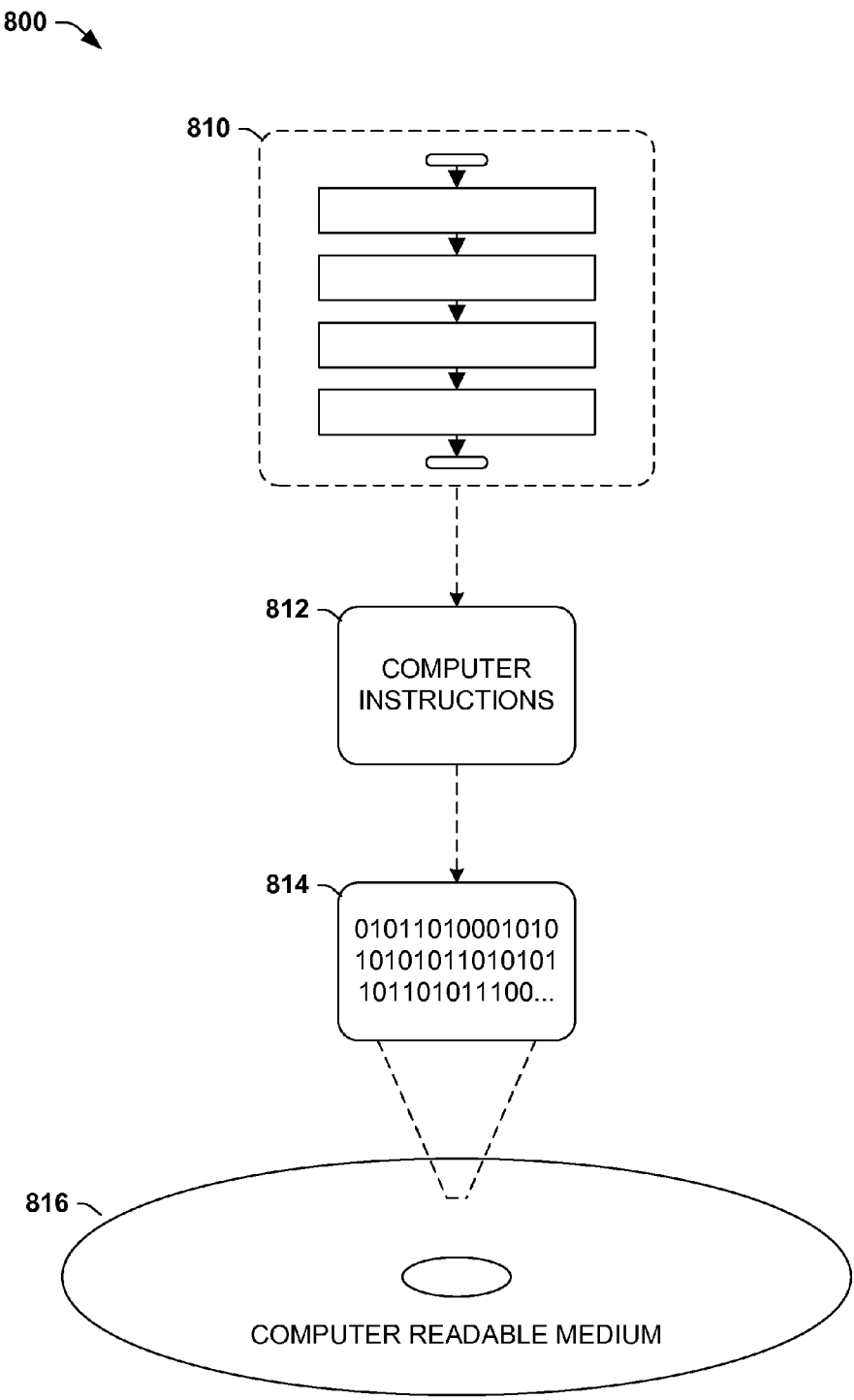
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 400 of FIG. 4, for example. In another such embodiment, the processor-executable instructions 804 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
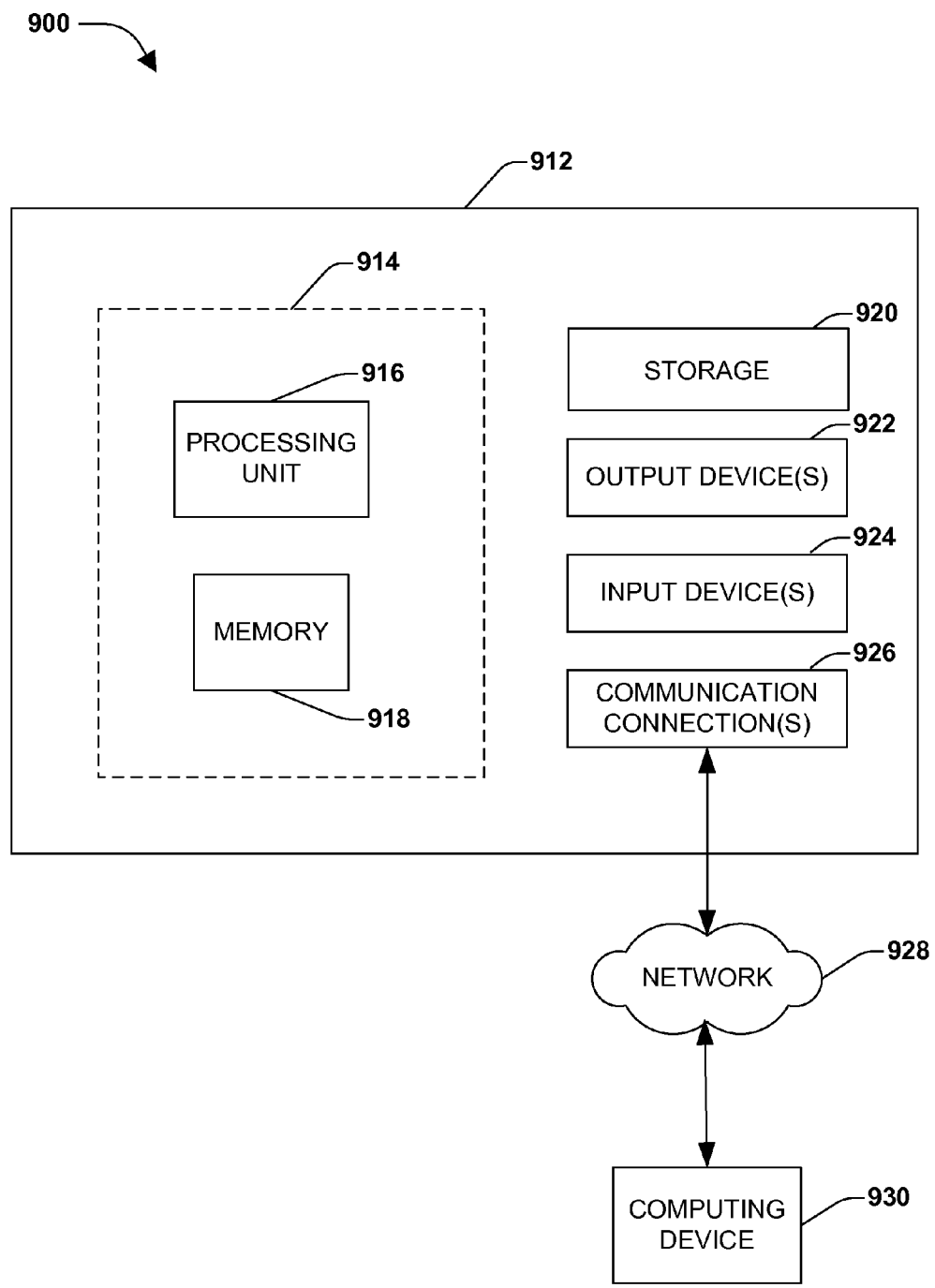
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for securely relaying a request to a process running on a computing device from a web application, comprising:
  a bridge message client component installed within a web application running in a browser environment local to a computing device, configured to:
    establish a secure local connection with a bridge server component based upon using a bridge message client identification to identify the bridge message client component as originating from a trusted source associated with the bridge server component, the bridge server component hosted within the computing device outside the browser environment; and
    relay, through the secure local connection, a request from the web application to the bridge server component for routing to a process running on the computing device outside the browser environment.

2. The system of claim 1, the bridge message client component comprising a communication channel identification configured to identify a communication channel to host the secure local connection to the bridge server component.

3. The system of claim 1, the web application downloaded from a website, the downloaded web application comprising the bridge message client component.

4. The system of claim 1, the web application comprising at least one of a desktop gadget or a social network application.

5. The system of claim 1, comprising:
  the bridge server component configured to:
    receive, through the secure local connection, the request from the bridge message client component; and
    forward the request to the process if a determination is made that the bridge server component is configured to respond to the request.

6. The system of claim 5, the bridge server component configured to:
  receive a response to the request from the process; and
  relay, through the secure local connection, the response to the bridge message client component for the web application.

7. The system of claim 6, the bridge message client component configured to:
  forward the response to the web application.

8. The system of claim 1, the web application associated with a multimedia runtime environment.

9. The system of claim 1, the bridge message client component and the bridge server component originating from a root domain of the trusted source.

10. A method for securely relaying a request to a process running on a computing device from a web application, comprising:
  establishing, by a bridge message client component installed within a web application running in a browser environment local to a computing device, a secure local connection with a bridge server component based upon using a bridge message client identification to identify the bridge message client component as originating from a trusted source associated with the bridge server component, the bridge server component hosted within the computing device outside the browser environment; and
  relaying, by the bridge message client component through the secure local connection, a request from the web application to the bridge server component for routing to a process.

11. The method of claim 10, comprising:
  receiving, by the bridge server component through the secure local connection, the request from the bridge message client component; and
  forwarding, by the bridge server component, the request to the process.

12. The method of claim 11, comprising:
  receiving, by the bridge server component, a response to the request from the process; and
  relaying, by the bridge server component through the secure local connection, the response to the bridge message client component for the web application.

13. The method of claim 12, comprising:
  forwarding, by the bridge message client component, the response to the web application.

14. The method of claim 10, the web application comprising a desktop gadget.

15. The method of claim 10, the web application comprising a social network application.

16. The method of claim 10, the web application associated with a multimedia runtime environment.

17. The method of claim 10, the bridge message client component and the bridge server component originating from a root domain of the trusted source.

18. The method of claim 10, the bridge message client installed in the web application as a separate downloadable module from the trusted source.

19. The method of claim 10, the bridge message client component comprising a communication channel identification configured to identify a communication channel to host the secure local connection to the bridge server component.

20. A computer readable medium, excluding signals, comprising computer executable instruction that when executed via a processing unit perform a method for facilitating communication between a web application and a process running on a computing device, the method comprising:

establishing, by a bridge message client component installed within a web application running in a browser environment local to a computing device, a secure local connection with a bridge server component based upon using a bridge message client identification to identify the bridge message client component as originating from a trusted source associated with the bridge server component, the bridge server component hosted within the computing device outside the browser environment;

relaying, by the bridge message client component through the secure local connection, a request from the web application to the bridge server component for routing to a process running on the computing device outside the browser environment;

receiving, by the bridge server component, a response to the request from the process; and relaying, by the bridge server component through the secure local connection, the response to the bridge message client component for the web application.

21. A system for securely relaying a request to a process running on a computing device, comprising:

a bridge message client component installed within a browser environment local to a computing device, configured to:

establish a secure local connection with a bridge server component based upon using a bridge message client identification to identify the bridge message client component as originating from a trusted source associated with the bridge server component, the bridge server component hosted within the computing device outside the browser environment; and relay, through the secure local connection, a request to the bridge server component for routing to a process running on the computing device outside the browser environment.

* * * * *